United States Patent Office 2,885,893
Patented May 12, 1959

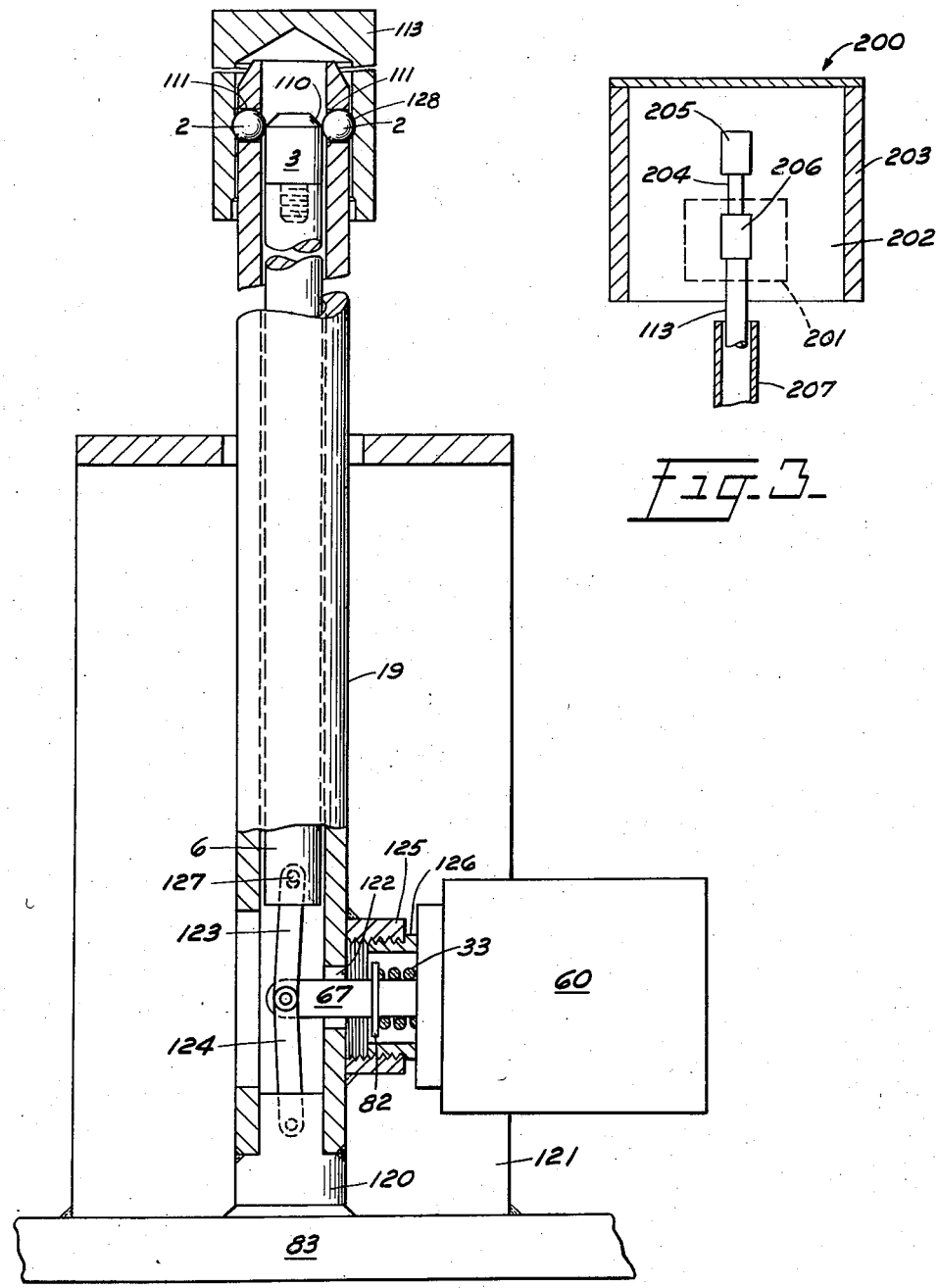

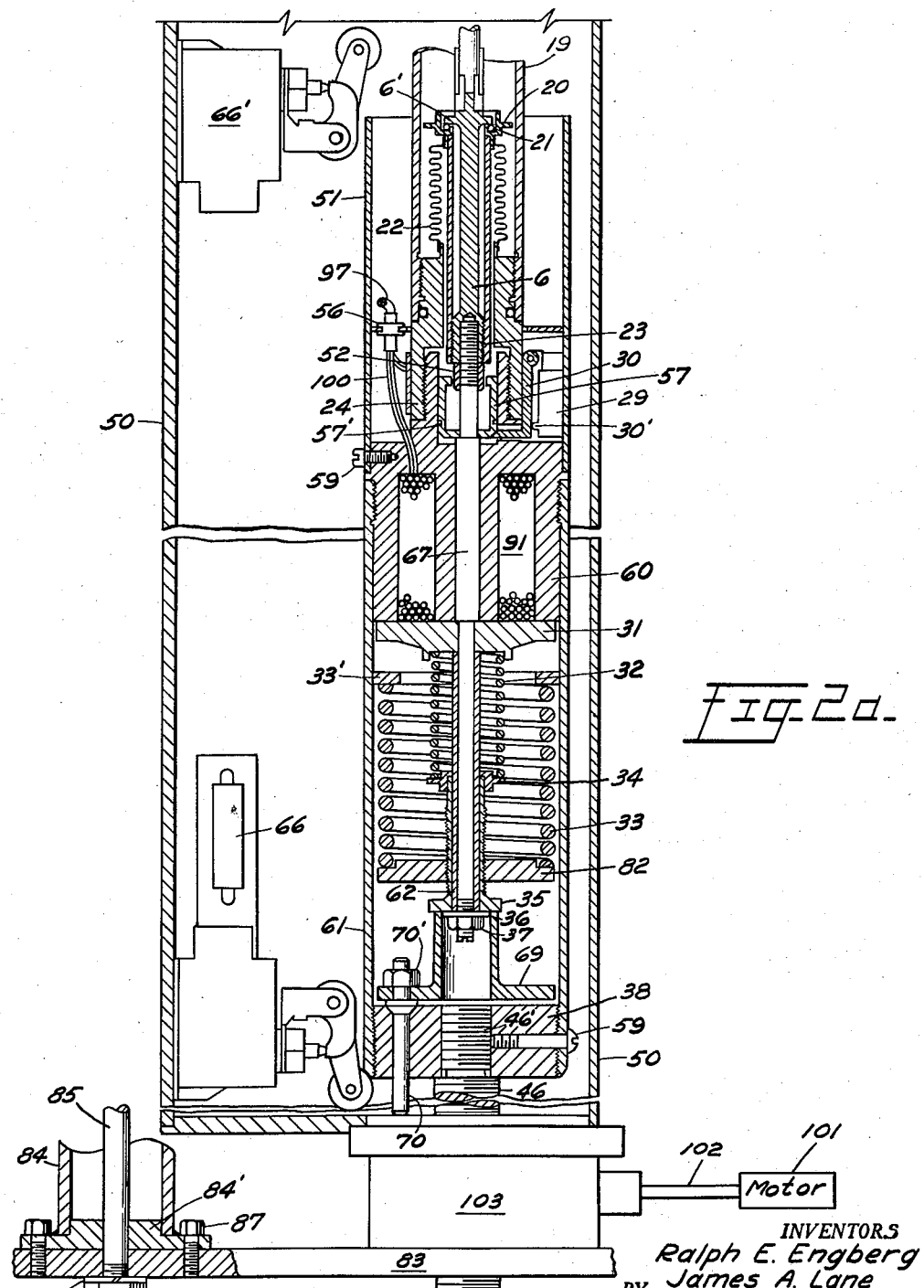

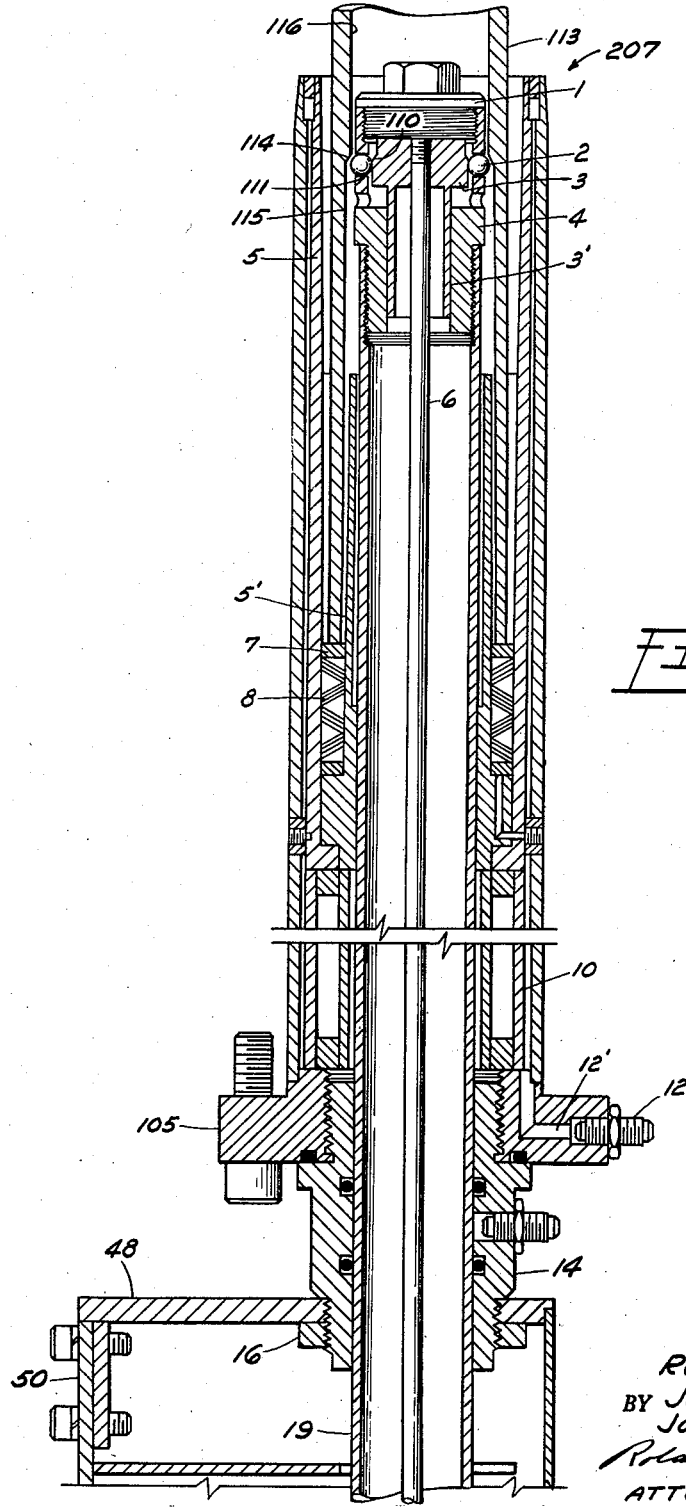

2,885,893

REACTOR CONTROL MECHANISM

James A. Lane, Ralph E. Engberg, and Jack M. Welch, Oak Ridge, Tenn., assignors to the United States of America as represented by the United States Atomic Energy Commission Application February 23, 1954, Serial No. 412,128

2 Claims. (Cl. 74—2)

Our invention relates to quick-releasing mechanisms, and more especially to a novel mechanism especially adapted for very rapid releasing of a device upheld in a cocked position to allow the same to fall by gravity. The invention may be used in safety systems of various sorts, such as dropping of a gate to block an exit in the event of fire or emergency, opening a normally closed port or door on receipt of a given electrical signal, or dropping a safety rod in a nuclear reactor.

To insure safety of operation of a nuclear chain reactor, existing reactors are provided with instruments for detecting the neutron flux within the reactor, instruments for converting the flux measurements to electrical signals, and one or more safety rods, carrying material which voraciously absorbs neutrons, the rods being actuated by the electrical signals. Normally, such safety rods are held out of the active region or core of the reactor by electromagnets mounted atop the reactor. An electrical signal indicative of a dangerously high neutron flux level will cause the current through the electromagnet holding coil to decrease, thus releasing the rod and allowing it to fall by gravity into the core of the reactor.

Since the rods must fall by gravity, prior safety mechanisms have been located atop the reactor. But in a research reactor, the top working surface of the reactor is needed for research apparatus utilizing the neutrons available from the reactor, so that it would be more convenient if the control mechanism could be removed from the top surface of the reactor. In addition, the large electro-magnets conventionally provided to hold the safety rods are very costly, since they must be especially wound for great holding power and quick release time. But of more fundamental importance, the release times which have been achieved heretofore are too great (20-30 microseconds) to insure complete safety of operation, since even complete cessation of current through the magnet coil will not cause immediate release of the rod, due to the finite time required for the magnetic field of the coil to collapse. In attempting to secure faster release time, prior control rods have been made extremely heavy, to insure prompt drop-out despite the forces of friction and the magnet's residual magnetism, but heavy rods are both too costly and too bulky to be completely satisfactory from the economic and space standpoints.

With a knowledge of the shortcomings of safety release systems of the prior art, it is an object of our invention to provide a quick-release mechanism for releasing suspended or cocked devices as rapidly as is practicable upon receipt of a control signal. A further object of our invention is to provide a safety rod release system which does not require a large, expensive, electromagnetic holding coil. Another object of our invention is to provide a quick-release system which does not require a heavy weight, so that the rod to be dropped may be reduced in size and weight without dangerous slowing down of the release action. A further object of the invention is to provide a safety rod release mechanism which may be installed at the base of a nuclear reactor, leaving the top surface free for experimental apparatus.

Yet another object of our invention is to provide a quick-release mechanism which requires only a relatively light magnet, and which has other mechanical means for supporting the major part of the load of the suspended device, so that quick drop-out may be achieved when the magnet is de-energized.

Other objects and advantages of our invention will become more apparent from the following detailed description of a preferred embodiment thereof, when read in conjunction with the appended drawings, in which:

Fig. 1 illustrates a simplified embodiment of our quick-release mechanism.

Figs. 2a and 2b illustrate in detail a preferred embodiment of our invention, with Fig. 2a showing the lower portion and Fig. 2b showing the upper portion thereof, and Fig. 3 illustrates schematically one possible use of our invention in a reactor safety system.

In accordance with our invention an electrical control signal, such as may be provided by radiation detection or other alarm condition sensing devices, is delivered to an electromagnetic solenoid, the armature of which is coupled to an actuating mechanism. The solenoid is energized when the mechanism is in its upper or cocked position. In such position, the mechanism engages a plurality of hard balls, forcing them outwards into engagement with a shoulder or recess in a corresponding section of a tubular extension on the device to be held up. When the control signal to the solenoid suddenly ceases, the armature drops out, allowing the actuating mechanism to move slightly but rapidly. The weight of the device held up will urge the balls inward against a beveled portion of the then-fired actuating mechanism and away from the engaging section of the tubular extension, thus allowing the upheld device to fall freely under the influence of gravity.

Referring now to Fig. 1, which illustrates in simplified form the operation of one form of our invention, a base plate 83 is provided with a stepped boss 120 over which is secured one end of a hollow cylindrical guide tube 19. Solenoid 60 is attached to guide tube 19 through boss 125, which is internally threaded to receive the tubular threaded extension 126 on the solenoid. Rod 67, carried by the solenoid 60, extends into an aperture 122 in the guide tube. At the outer extremity of rod 67, links 123, 124 are pinned together. The lower end of link 124 is pinned to boss 120, while the upper end of link 123, provided with an elongated aperture 127, is pinned to the tie rod 6, which moves within the hollow guide tube 19. A coil spring 33 urges the rod 67 away from solenoid 60 by pressing against a spring retainer flange 82. The upper end of the tie rod 6 carries a plunger 3, the top of which is beveled at 45°. Four apertures 111 spaced equally around the periphery of guide tube 19, are provided to receive four hard metal balls 2. The balls may be retained within the guide tube apertures by suitable shaping of the apertures 111 to allow radial movement while preventing complete fall-out.

The lower end of the movable safety rod, or an extension connected to the mechanism desired to be released, may be provided with a suitable tubular portion 113 which fits over the guide tube 19. The extension is provided with a suitable groove 128 on the inside wall near the lower end, to receive the balls 2 when they are forced outwardly by plunger 3.

In typical operation of our quick-release mechanism, the rod and extension 113 is raised by some suitable external means until the groove 128 registers with apertures 111. The solenoid 60 is energized, pulling the links into a vertically aligned position, moving tie rod 6 upward so that the beveled edge of head 3 forces the balls 2 outward and into engagement with the groove 128. As long as the solenoid is energized, the balls will be held in the groove, keeping the rod in position at its highest point. When the solenoid is de-energized, spring 33 instantly forces rod 67 out from the solenoid, and the links collapse slightly, dropping the tie rod 6 downward just enough to permit the balls 2 to be urged inwardly against the bevel 110 at the top of the head by the weight of the mechanism and its extension. This inward movement disengages the balls from the groove 128, and allows the rod and extension 113 to drop due to gravity.

Referring now to Figs. 2a and 2b the preferred embodiment of our invention is illustrated in one form in which it may be utilized with the safety rod of a nuclear reactor. Drive motor 101 is coupled to drive shaft 102 which forms the input to the reduction gear 103. This gear drives the threaded drive rod 46 up or down, depending on the direction motor 101 turns. The reduction gear 103 is mounted upon steel motor plate 83, which may be suspended from the floor of the room containing the reactor by means of a plurality of support rods 85 disposed along the center of support columns 84, which may be hollow steel tubing welded at the lower end to flanged boss 84'. The boss is held firmly against the plate 83 with screws 87, while nut 86, carried on the support rod 85, is held firmly in place below the motor plate by means of lock washer 88.

The upper end of drive rod 46 extends into housing 50 which is mounted atop the reduction gears 103 and which provides suitable mounting space for limit switches 66, 66'. These switches may be of the conventional microswitch type, size BZE–2RQ2. Lower limit switch 66 has its contact mounted to engage magnet jacket 61 at the lower extremity of downward travel of the magnet assembly, while housing 51 will strike and actuate the contact of switch 66' at the upper extremity of the magnet travel. The drive rod 46 has a reduced upper portion 46' which is threaded to engage correspondingly internally threaded end plug 38, which is threaded externally to engage jacket 61 and also is held in place by set screw 59. Three holes, 120° apart, are provided in the plug 38 to receive guide pins 70. These pins have an upper threaded portion which passes through a registering aperture in reset plate 69 and engages a corresponding nut 70'. The upstanding tubular portion of plate 69 is not of sufficient diameter to permit entry of the head of spring retainer screw 35, but is large enough to allow the lower end of rod 67, washer 36, and retaining nut 37 to move downwards thereinto until the spring retainer screw surface strikes the top of the reset plate. Screw 35 is hollow and fits around tube 62, which in turn forms a sliding fit over the reduced section of rod 67 between armature 31 and the head of screw 35. Spring retainer 34 is carried by the end of screw 35 and urges a spring 32 upward against armature 31.

The magnet core 60 carries winding 91, the two opposite ends of which are brought out through stranded wire 100, insulated to withstand the high voltage induced in the coils when the magnet is suddenly cut off. Armature 31 is carried on rod 67 and will move upwards when the magnet 91 is energized but will move downwards due to the urging of spring 33 against spring retainer 82, which is threaded to engage screw 35, when the magnet is de-energized. Spring 33 is restrained at the upper end by the shoulders 33' extending inwardly from the magnet housing or jacket 61 so that the force it exerts against spring retainer 82 will tend to move rod 67 downward, carrying rod 67 and armature 31 therewith.

The upper end of magnet core 60 is provided with an upstanding tubular portion which is threaded around its periphery to engage a correspondingly threaded connector sleeve 24. The upper extremity of rod 67 is threaded and engages a correspondingly threaded counterbore in the lower end of tie rod 6. The counterbored end of rod 6 is threaded around its outer periphery to engage a correspondingly threaded internal section of bellows coupler 23. A friction ring 57' is provided in a peripheral groove around switch actuator 57. The annular actuator abuts against the inner surfaces of the upstanding portion of the core 60, receives the upper portion of rod 67 through its lower central aperture, and receives nut 52 which is carried by the upper extremity of rod 67, through its upper central aperture. Bellows 22 is provided to make a water-tight seal between the magnet and the upper portion of the drive mechanism, and is provided with an end fitting 20 and an O-ring 21. Tie rod 6 is provided with a flange 6' which presses against the O-ring to form a water-tight joint.

Micro-switch 29, which is preferably the "Electro-Snap" single pole double throw type switch, is carried on one side of the housing 51. The switch is provided with an arm 30, which presses against a button 30' to actuate the switch when rod 67 moves down, forcing actuator 57 radially outward against the switch arm. Set screw 59 serves to secure the housing 51 to the magnet core, while a portion of the core 60 is threaded to engage correspondingly threaded jacket 61.

The leads from the magnet winding and the switch 29 are brought out through grommet 56 into a spiral coil of music wire in flexible tubing 97, which may be one quarter inch in outer diameter. As the mechanism moves, no strain is placed upon the wires, due to the flexible coil arrangement.

Referring now to Fig. 2b, upper bracket 48 closes the top of switch mounting bracket 50 and is provided with an aperture through which guide tube 19 extends upwardly. Seal housing 14 is threaded near its lower extremity to receive nut 16, which holds the housing in place and abuts against the undersurface of bracket 48. Flanged sleeve 105 is internally threaded at its lower end to engage the correspondingly threaded upper portion of housing 14 and receives the annular shock absorber support 10 on its stepped upper surface. Water under pressure may be admitted through male fitting 12 and internal channel 12' in sleeve 105. The support 10 carries shock absorber tube 5, which is a hollow tube with a flanged base. An inner sleeve 5' is aligned coaxially with the rod 6 and engages the internal periphery of the tube 5 near its lower flanged portion. Plate 7 is an annular striker plate adapted to receive the force of the sliding safety rod and to transmit the force to the spring washer 8, which is disposed in the annular groove between tube 5 and sleeve 5'.

At the upper extremity of rod 6, an end cap 1 is threaded to engage the correspondingly threaded head 4. The upper end of guide tube 19 is internally threaded to receive correspondingly threaded head member 4 which is provided with an internal plunger 3. The plunger comprises a body and a tubular extension 3', the body being provided with an axial aperture for receiving the upper end of the rod 6. The plunger extension 3' fits snugly against a portion of the head 4, but the upper part of the plunger body is of slightly smaller diameter than the lower part and is provided with beveled portion 110 connecting the larger and smaller diameter portions. Eight equally-spaced apertures 111 are provided in the upper portion of the head to receive Stellite balls 2. The apertures are preferably narrower at the outer surfaces to hold the balls in place.

Safety rod 204, shown schematically in Fig. 3, is provided with a tubular extension 113 which extends into the annular space between shock absorber tube 5 and inner sleeve 5'. The extension is provided with a beveled portion 114 which connects the region of smaller internal diameter 116 with one of a greater internal diameter 115, thus providing a beveled shoulder to engage balls 2.

In operation, when the magnet holding coil 91 is energized, the armature 31 will be held flush against the bottom of the magnet core, thus holding rod 6 and associated plunger 3 in their most upward position. When, however, the coil 91 is de-energized, armature 31 will fall, pulling with it rod 67, rod 6 and plunger 3. The balls 2 are then allowed to move along the surface of the plunger across the beveled portion to the upper portion of reduced diameter. They are constantly urged inwardly by the pressure exerted thereon by the shoulder 114, so that they will move inwardly and enter the annular space surrounding the reduced upper portion of the plunger inside the head 4. The diameter of the reduced plunger is such that the balls will clear shoulder 114, and will release the rod 113 so that it may fall due to the acceleration of the gravity. The lower end of the tubular extension will come to rest against the striker plate 7, transmitting the shock of the fall to the washer 8. The annular space between the shock absorber tube 5 and the inner sleeve 5' may be filled with a liquid, such as water, so that a dash-pot action results as the tubular extension of the safety rod is forced downwardly through the liquid.

The mechanism may be lowered to the normal position for recocking by means of motor 101. The motor is energized, turning shaft 102, driving reduction gear 103, and moving drive rod 46, lowering with it plug 38 and reset plate 69, spring retainer screw 35, spring retainer 34, and spring retainer 82. As plug 38 descends, pins 70 will strike the bottom plate atop reduction gears 103, stopping the descent of reset plate 69. Housing 61 continues to descend, bringing the magnet assembly down. Screw 35 strikes plate 69 and stops, but the magnet descends slightly more until switch 66 is tripped by housing 61. The last travel of the magnet, while screw 35, rod 67 and springs 32, 33 were stopped, resets the armature 31 against the core 60 in the cocked position by compression of reset spring 32 between the armature and plate 34. Magnet coil 91 should then be energized to hold the armature in place.

The balls 2 have thus been lowered into position so that they register with the shoulder 114 in the extension 113. When the small upward movement of rod 67 occurs as above described, rod 6 and plunger 3 are also raised forcing balls 2 outward to engage the shoulder of the tubular extension 113. Then drive motor 101 is reversed, running the cocked mechanism up until the limit switch 66' is actuated by the top of housing 51, thus limiting the upper travel of the rod by shutting off motor 101. Then the energized magnet holds the mechanism in place, with plunger 3 and the surfaces of the apertures in head 4 carrying the mechanical load.

Fig. 3 illustrates schematically how our quick-release mechanism has been incorporated into the design of a nuclear reactor control and safety system. Referring now to Fig. 3, a nuclear reactor is indicated generally at 200. As is well-known in the reactor art, such a device may comprise an active core 201, made up of fissionable material such as uranium enriched in the isotope of atomic weight 235 disposed in a moderator 202 such as graphite. A radiation shield 203 surrounds the reactor for personnel protection. Several control rods, not shown, may be provided to change and control the reactivity of the device. The safety rod 204 may be provided to shut down the reactor by absorbing neutrons as rapidly as they are produced, and may comprise an absorber section 205 of boron, cadmium, or other good neutron absorber, and an active portion 206, which may be a section of the core 201 disposed longitudinally in a passageway through the reactor. When the rod is in the upper position, the active portion 206 is disposed within the core, and the reactor will operate, but when the rod falls to a lower position, the absorber section 205 drops within the core stopping the chain reaction and shutting down the reactor. The rod is provided with a tubular extension 113 which slides into release mechanism 207, as is shown in greater detail in Figs. 1 and 2b.

Thus, it is apparent, that we have invented a novel quick-release mechanism especially adapted to release a weight for free gravity fall substantially instantaneously upon cessation of an electrical holding signal, without the delay due to the long release time of a magnet designed to hold up such weight against gravity.

What we claim is:

1. A quick-release mechanism comprising a solenoid for receiving a holding current and provided with an armature adjacent its lower end, a push rod extending above and below and carried by said armature and movable vertically therewith axially of said solenoid, spring means continuously urging said rod downward against said armature, a cylindrical guide member provided with a plurality of radial apertures, a sleeve member coupling the lower extremity of said guide member with said solenoid to support said guide member, a plurality of ball bearings disposed in said apertures and movable to inner and outer positions therethrough, a plunger carried by said push rod for contacting said bearings and provided with a normal portion to force said bearings outwardly and a reduced portion to allow inward bearing movement through said apertures, a tubular member provided with an internal shoulder which registers with said bearings and is upheld thereby when said bearings are maintained in their outer position and which urges said bearings inwardly against said plunger, the inward movement of said bearings to contact said reduced portion of the plunger when said plunger moves responsive to interruption of said current being such that said shoulder clears said bearings to allow said tubular member to fall by gravity, means for lifting said tubular member to its original cocked position, and means for resetting said armature and plunger to the energized positions comprising a threaded member axially aligned with and below said push rod, a correspondingly threaded plug carried thereby, a tubular housing carried by said plug and provided with a threaded upper portion to engage said solenoid, a flanged tubular reset member carried by said plug, a doubly flanged sleeve slidably carried by said push rod at its lower extremity, a second spring disposed between said armature and the upper flange on said flanged sleeve to urge said armature into the energized position, and means for rotating said threaded member within said plug to lift said reset member against the lower flange on said flanged sleeve to compress said spring to urge said armature into the energized position.

2. A safety system comprising a two-position member movable to upper and lower vertically aligned positions, a tubular extension depending downwardly from said member and provided with an internal inclined shoulder disposed circumferentially about the inner surface thereof, a stop disposed in vertical alignment below said extension to limit movement thereof, a housing disposed below said stop, a fixed support, means for positioning said housing relative to said fixed support, a guide tube disposed concentrically within said extension and provided with a plurality of radial apertures, a plurality of latch balls carried in said apertures and normally registering with and supporting said shoulder, a plunger having positions of normal and reduced diameter disposed axially within said guide tube, said normal diameter portion normally contacting said balls to urge them radially outward to suport said extension in its upper position, an electromagnet carried by said housing and provided with a vertically movable armature disposed therebelow, a sleeve connecting said guide tube with said electromagnet to support said guide tube, means to normally energize said electromagnet to normally support said armature in an upper position, a vertical push rod extending axially both above and below said armature and electromagnet and rigidly fastened to said armature to move therewith, said push rod carrying said plunger at its upper end, and spring means continuously urging said rod downward to align said reduced portion with said balls in the absence of a holding current in said electromagnet, allowing free fall of said member to said lower position.

References Cited in the file of this patent

UNITED STATES PATENTS

| | | |
|---|---|---|
| 1,935,715 | Hunt et al. | Nov. 21, 1933 |
| 2,130,559 | Papp | Sept. 20, 1938 |
| 2,139,193 | Lamoethe et al. | Dec. 6, 1938 |
| 2,369,362 | Marziani | Feb. 13, 1945 |
| 2,708,656 | Fermi et al. | May 17, 1955 |
| 2,780,112 | Young | Feb. 5, 1957 |

FOREIGN PATENTS

| | | |
|---|---|---|
| 464,754 | Germany | Aug. 29, 1928 |
| 922,544 | France | June 11, 1947 |